United States Patent Office 2,993,025
Patented July 18, 1961

2,993,025
POLYOXYMETHYLENE COMPOSITIONS STABILIZED WITH A SYNTHETIC SUPERPOLYAMIDE
Richard Glenn Alsup and Philip Ervin Lindvig, Wilmington, Del., assignors to E. I. du Pont de Nemours and Company, Wilmington, Del., a corporation of Delaware
No Drawing. Filed June 2, 1958, Ser. No. 738,972
9 Claims. (Cl. 260—42)

This invention relates to a novel composition of matter comprising polyoxymethylene stabilized with a synthetic superpolyamide.

This is a continuation-in-part of our application Serial Number 600,158, filed July 26, 1956, and now abandoned.

In United States Patent 2,768,994, issued October 30, 1956, to R. N. MacDonald there are disclosed and claimed polyoxymethylenes having an unexpectedly high level of thermal stability. In copending patent application Serial No. 681,188, filed August 30, 1957, by J. O. Punderson and S. Dal Nogare, there are disclosed esterified polyoxymethylenes which normally have a higher degree of thermal stability than unesterified polyoxymethylenes. In copending application Serial No. 682,325, filed September 6, 1957, by N. Brown, W. P. Langsdorf, and C. E. Schweitzer, there are disclosed etherified polyoxymethylenes which also have this higher degree of thermal stability. Even though the compositions disclosed in these copending applications are distinguished from the prior art by their high level of thermal stability, that stability can be enhanced by the incorporation of additives which protect the polymer chain from degradative reactions with components of the atmosphere or other environment in which the polyoxymethylene may be placed. For example, oxygen may cause some chain cleavage, water may cause a certain amount of degradation by hydrolysis, and the presence of acids may cause degradation. These types, and other similar types, of degradation caused by extrinsic forces, are different from the ordinary thermal degradation in that the former may occur to a perfect polymer chain structure, while the latter is normally due to an inherent weakness in the chain structure. The former type of degradation is most conveniently dealt with by the incorporation of additives into the polymer composition, those additives being capable of combatting the extrinsic force causing the degradation. The present invention provides such an additive in the form of a synthetic superpolyamide, which, surprisingly, imparts a remarkable stabilizing effect to the polyoxymethylene which is being protected.

It is an object of this invention to provide a novel composition comprising a stabilized, high molecular-weight polyoxymethylene. Another object is to provide stabilized, high molecular-weight polyoxymethylene dicarboxylates and diethers. Other objects will appear as the invention is more fully described hereinafter.

The objects of this invention may be accomplished by blending or mixing one of a class of synthetic superpolyamides with a high molecular-weight polyoxymethylene. The amount of superpolyamide which is employed may be any amount which is not less than about 0.001%, while more than about 50% is impractical, but not inoperative. The preferred amount of superpolyamide is from about 0.1% to about 10% by weight of the polyoxymethylene. Specifically, the objects of this invention may be accomplished by providing a composition of matter comprising a polyoxymethylene and 0.001% to 50% by weight of a superpolyamide uniformly distributed throughout the polyoxymethylene; the said polyoxymethylene being an addition polymer of formaldehyde in which the polymer chain, exclusive of the terminal portions of the chain, is a series of methylene-to-oxygen linkages of the general formula —(CH$_2$—O)$_n$— where $n$ is an integer of at least 500, the said superpolyamide being a macromolecular condensation polymer which has recurring carboxamide linkages as integral portions of the polymer chain, and which upon hydrolysis yields monomeric compounds selected from the group consisting of (1) mixtures of dicarboxylic acids and diamines, and (2) omega-aminomonocarboxylic acids.

The superpolyamide may be incorporated into the polyoxymethylene in any manner known in the art by means of which one solid may be uniformly dispersed in the form of small particles throughout the main body of another solid, e.g. powdered superpolyamide may be mixed with particulate polyoxymethylene in a dry blender or on milling rolls. Alternatively, the superpolyamide may be dissolved in a suitable solvent, the superpolyamide solution mixed with a slurry of polyoxymethylene in that solvent, and the entire mixture evaporated to dryness. The melting point and other physical properties of the particular superpolyamide employed may determine the procedure used to incorporate the superpolyamide into the polyoxymethylene being stabilized.

The superpolyamide which is employed as a stabilizer may be any of the macromolecular superpolyamides, commonly known as nylons, in which carboxamide linkages

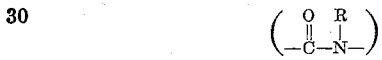

for an integral part of the polymer chain and which upon hydrolysis yield monomeric compounds selected from the group consisting of (1) mixtures of dicarboxylic acids and diamines and (2) omega-aminomonocarboxylic acids. Preferably, the above superpolyamide should have a melting point below about 220° C. and should have carboxamide linkages

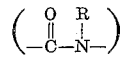

where R is hydrogen alkyl or alkoxy. Normally, the mixtures of dicarboxlic acids and diamines noted in (1) above would be equimolar mixtures. Some general statements may be made which might influence the choice of a superpolyamide for a particular application. Some superpolyamides appear to produce a tan discoloration when the polyoxymethylene containing that superpolyamide is subjected to molding conditions. Substituted superpolyamides, such as the product of N,N'-dimethyl ethylene diamine and sebacic acid, have less tendency to cause the tan discoloration than do the unsubstituted polyamides. Furthermore, some structural characteristics appear to affect the stabilizing power of the superpolyamide. For example, methyl substitution on the carbon alpha to the amide group seems to result in a less effective thermal stabilizer than a corresponding, unsubstituted superpolyamide. A superpolyamide prepared from a secondary amine appears to have less stabilizing influence than a superpolyamine prepared from a primary amine. The ability of the superpolyamide to stabilize the polyoxymethylene increases as the degree of polymerization of the superpolyamide increases. Superpolyamides with a low degree of polymerization, however, provide some stabilizing effect, and they are meant to be included as stabilizers in this invention. The preferred degree of polymerization is from about 100 to about 200.

The term "polyoxymethylene," wherever used in this description and in the appended claims, is intended to be synonymous with an addition polymer of formaldehyde in which the polymer chain exclusive of the terminal portions of the chain, is a repeating series of carbon-to-oxygen, or, to be more precise, methylene-to-oxygen, linkages formed by recurring —(CH$_2$O)— structural units. If the polymer chain is terminated with hydroxyl groups, methyl groups, carboxylate groups, or some other group, the polymer is still within the term "polyoxymethylene" since the chain structure, rather than the terminal groups of the chain, determines the polymer's characteristics. Thus, polyoxymethylene carboxylate, polyoxymethylene glycol, and polyoxymethylene diether are all intended to be encompassed within the term "polyoxymethylene." "High molecular weight polyoxymethylenes" are intended to be those polyoxymethylenes having a degree of polymerization greater than 500, or, in other words, a number average molecular weight greater than 15,000; thus having the formula: —(CH$_2$O)$_n$— wherein $n$ is an integer greater than 500. Polyoxymethylene diacetates may be prepared by the processes described and claimed in copending applications Serial No. 681,188, filed by J. O. Punderson and S. Dal Nogare on August 30, 1957, and Serial No. 443,703, filed by S. H. Jenkins and J. O. Punderson on July 15, 1954, now abandoned. Polyoxymethylene diethers may be prepared by the processes described and claimed in copending application Serial No. 682,325 filed by N. Brown, W. P. Langsdorf, and C. E. Schweitzer, filed September 6, 1957.

Other additives, such as pigments, fillers, antioxidants, and the like, may also be included in the composition of this invention.

The thermal stability of the polymeric compositions of this invention is reported herein as "syringe stability" at 222° C. (SS$_{222}$). The units of SS$_{222}$ are ml. of gas evolved per gram of polymer per 10 minutes elapsed time at 222° C. The SS$_{222}$ of a polymeric sample is determined by heating a weighed sample of polymer in a hypodermic syringe at 222° C. and observing the position of the syringe cylinder at 10 and 20 minutes after the beginning of the test. The syringe which is used should be well cleaned and preferably should be about 50 ml. of volume. Polymer in the form of a pressed pellet or molding powder cubes, is weighed to the nearest 0.001 gram and placed in the syringe, which is lubricated between the piston and the cylinder with a high quality, inert grease such as a polysilicone. The syringe is evacuated and filled with nitrogen several times. Silicone oil is drawn into the syringe and ejected until about 5 ml. remains surrounding the polymer pellet serving as a means for expelling all gases prior to the test and as a heat transfer medium during the test. The nozzle of the syringe is then sealed and the syringe is placed in a vapor bath at 222° C. The vapor bath may be vapors of methyl salicylate. The position of the syringe cylinder is noted at 10 minutes and 20 minutes after the syringe is first placed in the vapor bath. If desired, the test may be carried on to 30 minutes or more. The change in the position of the syringe piston over a 10-minute period determines the amount of gas evolved in the test and, thus, the amount of polymer which has degraded to monomer or other gas. Thus, a value of 5.0 for SS$_{222}$ indicates an evolution of 5 ml. of gas per gram of polymer over the period from 10 to 20 minutes after the beginning of the test. If some other interval of time is employed herein, it will be indicated.

As may be seen hereinafter, polyoxymethylene dicarboxylate or polyoxymethylene diether is much more stable than polyoxymethylene glycol; however, in each case the stability may be enhanced by the presence of a superpolyamide as a thermal stabilizer. The preferred composition is a polyoxymethylene dicarboxylate or diether stabilized with a superpolyamide, such a composition having a syringe stability of less than about 10 milliliters per 10 minutes per gram measured in the 20–30 minute time interval after the beginning of the test. Such a syringe stability is one which approximates a reaction rate constant for thermal degradation at 222° C. ($k_{222}$) of less than 0.07.

The thermal degradation of polyoxymethylenes generally follows that predicted for a first-order reaction. From time to time there may be observed a slight variation from a first-order reaction, but it has been found that for all practical purposes the kinetics of a first-order reaction define this degradation reaction.

The thermal stability of polyoxymethylene has been reported in certain other instances as a reaction rate constant for thermal degradation at 222° C. ($k_{222}$) in units of percent by weight of the polymer which degrades per minute at 222° C. In United States patent 2,768,994 issued to R. N. MacDonald on October 30, 1956, certain polyoxymethylenes are claimed which have a $k_{222}$ of less than 1% by weight per minute. The relationship between $k_{222}$ and SS$_{222}$ may be closely approximated through the following equation:

$$k_{222} \text{ (percent/min.)} = \frac{\text{(volume of gas in ml. evolved in time } t\text{)} \times 0.0736}{\text{(time } t \text{ in minutes)} \times \text{(initial weight of polymer sample in grams)}}$$

The factor 0.0736 is a constant calculated on the assumption that all of the evolved gas is monomeric formaldehyde and that it behaves as an ideal gas. Based on the above equation it may be seen that a comparison of $k_{222}$ and SS$_{222}$ is as follows:

| $k_{222}$ (percent by weight/min.) | SS$_{222}$ (ml. gas/10 min./gram of polymer) |
|---|---|
| 1.0 | 136 |
| 0.5 | 68 |
| 0.1 | 14 |
| 0.05 | 7 |
| 0.01 | 1.4 |

Another physical property employed in the characterization of the compositions of this invention is "flow number" (F.N.). This property is of value in the qualitative determination of the moldability of the composition. Flow number has also been found to have a definite correlation with the number average molecular weight of the composition, an increase in flow number being indicative of a decrease in the number average molecular weight. For the polyoxymethylenes mentioned in the following examples, a flow number of about 1.0 is approximately equivalent to a number average molecular weight of 64,000 and a flow number of about 10.0 is approximately equivalent to a number average molecular weight of 33,000. The relationship of flow number to number average molecular weight depends upon the molecular weight distribution of the polyoxymethylene being tested, and, therefore, the above figures are not applicable to every known polyoxymethylene. The test is conducted by charging a convenient amount (5 grams is sufficient) of polymer into the cylinder of a melt indexing machine, the cylinder being maintained at 200° C. and being fitted with an extrusion orifice having a diameter of 0.0413± 0.0002 inch and a length of 0.158±0.001 inch. The piston (weighing 60 grams) is inserted into the cylinder and is loaded with a weight of 5000 grams. At an elapsed time of 5 minutes after the polymer is charged into the cylinder, the extrudate coming out of the orifice is cut off and discarded. At a total elapsed time of 6, 7, 8, 9, and 10 minutes, the extrudate is cut off and weighed to an accuracy of ±1%. The weights of these 5 extrudates are plotted versus time, and the best straight line is drawn through the five plotted points. The intercepts at 5 and at 10 minutes elapsed time are multiplied by 10 and reported as the "flow number" in grams/10 minutes at 5 minutes elapsed time and at 10 minutes elapsed time.

Another property which is employed in the characterization of the compositions of this invention is the "upper molding limit" (U.M.L.) of the composition. The U.M.L. is determined by injection molding bars measturing 5 inches x ½ inch x ⅛ inch in a one-ounce Watson-Stillman injection-molding machine. The molding conditions employed are a molding pressure of 300–1000 p.s.i., a mold temperature of 60° C., and a 30/30 mold cycle; i.e., pressure is applied to the molding powder in the mold for 30 seconds and then pressure is removed and the bar is extracted from the mold over a 30-second period. The cylinder temperature is raised in successive molding operations and the molded bars are examined for splay marks. The U.M.L. is the highest cylinder temperature at which less than 50% of the bars were splayed.

The following examples serve to illustrate certain embodiments of this invention.

EXAMPLE 1

Various superpolyamides were mixed at 200° C. on milling rolls with a polyoxymethylene diacetate having a number average molecular weight of 47,000. The amount of superpolyamide in each instance was 4% by weight of the polyoxymethylene diacetate. The resulting polymeric composition in each instance was tested to determine its physical properties, which are reported in Table 1.

Table 1

| Type of Polyamide [1] | Flow Number (g./10 min.) | | $SS_{222}$ (ml./10 min./gram) | |
|---|---|---|---|---|
| | 5 min. after start of test | 10 min. after start of test | 10–20 min. | 20–30 min. |
| 1 | Erratic | Erratic | 0.8 | 0.8 |
| 2 | 3.3 | 3.5 | 0.8 | 2.3 |
| 3 | 3.0 | 3.0 | 3.2 | 8.0 |
| Control (without polyamide) | 3.0 | 3.0 | 8.5 | 24.0 |

[1] 1—polyhexamethylene sebacamide+0.05% copper stearate.
2—terpolymer of approximately 38% polycaprolactam/35% polyhexamethylene adipamide/27% polyhexamethylene sebacamide.
3—N-methoxymethyl polyhexamethylene adipamide.

The erratic flow number for superpolyamide No. 1 in Table 1 was due to incomplete mixing of the superpolyamide and the polyoxymethylene diacetate, leaving small bits of unmelted superpolyamide in the milled composition.

EXAMPLE 2

Various types of superpolyamides were incorporated into a polyoxymethylene diacetate by means of milling for 10 minutes at 200° C. The polyoxymethylene diacetate had a number average molecular weight of 48,000. The amount of superpolyamide in each case was 1% by weight of the polyoxymethylene diacetate, which contained 0.2% by weight of 4,4'-butylidene bis(6-tertiary-butyl-3-methylphenol) as an antioxidant. The test results of these compositions are reported in Table 2.

Table 2

| Superpolyamide [1] | Flow Number (g./10 min.) | | $SS_{222}$ (ml./10 min./g.) | | |
|---|---|---|---|---|---|
| | 5 min. from start of test | 10 min. from start of test | 0–10 min. | 10–20 min. | 20–30 min. |
| 1 | 2.0 | 2.3 | 7.5 | 14.5 | |
| 2 | 2.1 | 2.3 | 4.7 | 12.3 | |
| 3 | 2.3 | 2.3 | 2.0 | 4.5 | 9.0 |
| 4 | 2.5 | 2.5 | 6.5 | 16.0 | |
| 5 | 2.4 | 2.5 | 5.0 | 2.0 | 2.5 |
| 6 | 2.4 | 2.7 | 0.75 | 1.0 | 1.0 |
| Control (without polyamide) | 2.9 | 2.9 | 11.5 | 22.0 | |

[1] Superpolyamides were condensation products of the following amines and acids:
1—1,1,6,6-tetramethylhexamethylene diamine/sebacic acid.
2—2,11-diaminododecane/2,2,5,5-tetramethyladipic acid.
3—2,5-dimethylpiperazine/glutaric acid.
4—2,5-dimethylpiperazine/suberic acid.
5—Bis-3-aminopropylether/adipic acid.
6—Terpolymer of approximately 38% polycaprolactam/35% polyhexamethylene adipamide/27% polyhexamethylene sebacamide.

EXAMPLE 3

A polyoxymethylene diacetate, having a number average molecular weight of 74,000, and containing 0.5% by weight of di-beta-naphthyl-para-phenylenediamine as an antioxidant, was mixed with various amounts of the terpolymer consisting of approximately 38% polycaprolactam/35% polyhexamethylene adipamide/27% polyhexamethylene sebacamide. The effect of the various amounts of polyamide stabilizer is shown below.

Table 3

| Percentage of Superpolyamide | $SS_{222}$ (ml./10 min./g.) | | | | | | |
|---|---|---|---|---|---|---|---|
| | 10–20 min. | 20–30 min. | 30–40 min. | 40–50 min. | 50–60 min. | 60–70 min. | 70–80 min. |
| 1.0 | 0.5 | 1.0 | 0.8 | 2.5 | 3.5 | 8.0 | 10.0 |
| 6.0 | 0.5 | 0.5 | 0.5 | 1.5 | 2.3 | 4.0 | 6.0 |
| 20.8 | 1.0 | 0.0 | 1.3 | 1.0 | 2.0 | 3.0 | 4.5 |
| 37.0 | 1.0 | 0.3 | 1.3 | 0.8 | 1.0 | 1.5 | 2.0 |

It is apparent that the polyoxymethylene diacetate may be stabilized by the incorporation of relatively large amounts of superpolyamide. At superpolyamide concentrations of 5% or less, no notable change in the mechanical properties of the polyoxymethylene diacetate occurs; however, at concentrations of about 20% or more, several of the mechanical properties of the polyoxymethlyene diacetate are changed materially.

For example, the tensile strength drops from about 10,000 to about 7600 p.s.i. when the superpolyamide concentration is changed from 1% to 20%. Similarly, Izod Impact Strength changes from about 1.23 to about 0.53 ft. lb./in.; flexural strength changes from about 421,000 to about 321,000 p.s.i.; and the heat distortion temperature at 264 p.s.i. changes from about 94° C. to about 81° C. over the same range of concentration of superpolyamide.

EXAMPLE 4

The procedure of Example 3 was repeated using a polyoxymethylene diacetate, having a number average molecular weight of 44,000, and containing 0.5% by weight of di-beta-naphthyl-para-phenylenediamine as an antioxidant, and employing small amounts of the same superpolyamide terpolymer. The results are shown below:

Table 4

| Percentage of Superpolyamide | Flow Number (g./10 min.) | | $SS_{222}$ (ml./10 min./g.) | | | |
|---|---|---|---|---|---|---|
| | 5 min. after start of test | 10 min. after start of test | 0–10 min. | 10–20 min. | 20–30 min. | 30–40 min. |
| 1.0 | 3.4 | 3.7 | 1.6 | 1.6 | 1.6 | 4.9 |
| 0.5 | 3.6 | 4.1 | 1.7 | 0.8 | 1.7 | 4.1 |
| 0.3 | 4.2 | 4.3 | 1.6 | 1.6 | 2.4 | 8.7 |
| 0.15 | 4.0 | 4.0 | 1.6 | 1.6 | 8.7 | |
| 0.05 | 4.3 | 4.3 | 1.5 | 4.6 | 21.0 | |
| 0.00 | 3.9 | 4.1 | 4.9 | 12.2 | 48.5 | |

EXAMPLE 5

In order to test the relative stabilizing effectiveness of superpolyamides having different degrees of polymerization, three different polymers were made from 4,4-dimethylheptamethylenediamine and sebacic acid. These polymers were added in the amount of 1% by weight to a polyoxymethylene diacetate (number average molecular weight of 48,000) containing 0.2% by weight of 4,4'- butylidene bis(6-tertiary-butyl-3-methylphenol). The results are shown in the following tabulation:

Table 5

| Degree of Polymerization of Superpolyamide | $SS_{222}$ (ml./10 min./g.) | | | | |
|---|---|---|---|---|---|
| | 0-10 min. | 10-20 min. | 20-30 min. | 30-40 min. | 40-50 min. |
| 40 | 0.4 | 2.1 | 4.9 | 7.6 | 12.2 [1] |
| 14.4 | 0.25 | 1.0 | 3.7 | 10.6 | (1) |
| 6.0 | 1.9 | 8.3 | (1) | | |

[1] Over 20.

EXAMPLE 6

The terpolymer of approximately 38% polycaprolactam/35% polyhexamethylene adipamide/27% polyhexamethylene sebacamide was employed as a stabilizer for high molecular-weight polyoxymethylene diacetate in the presence of, and in the absence of, an added antioxidant. When 1% of the superpolyamide terpolymer was present, and no antioxidant was present, the flow number of the composition increased from 3.6 grams/10 minutes to 33 grams/10 minutes when the composition was subjected to the action of milling rolls at 200° C. for 10 minutes in air. This is equivalent to a change in number average molecular weight from 44,000 to 17,000. When the same procedure was employed except that an antioxidant was present, e.g. 0.2% by weight of 4,4'-butylidene bis(6-tertiary-butyl-3-methylphenol), 0.2% by weight of di-beta-naphthyl-para-phenylenediamine, or the like, the flow number remained essentially constant. The $S_{222}$, however, was the same whether the antioxidant was present or absent.

EXAMPLE 7

A polyoxymethylene glycol, having a number average molecular weight above 100,000, was subjected to the action of milling rolls for 3 minutes at temperatures of about 180°–190° C. The polyoxymethylene glycol bubbled and ran off the milling rolls, and was found to have lost 22% of its weight due to that milling treatment. When 20% by weight of N-methoxymethyl polyhexamethylene adipamide was added to a similar portion of the same polyoxymethylene glycol and subjected to the same milling action, the composition did not bubble, it formed as a tan sheet on the rolls, and it lost no weight because of that treatment. When 20% by weight of polyhexamethylene adipamide was added to a similar portion of the same polyoxymethylene glycol and was subjected to the same milling action, the composition did not bubble on the rolls although it did lose about 6% of its original weight.

EXAMPLE 8

A methanol solution of a superpolyamide terpolymer containing approximately 38% polycaprolactam/35% polyhexamethylene adipamide/27% polyhexamethylene sebacamide was mixed with a high molecular-weight polyoxymethylene glycol, followed by evaporation of the methanol to produce a solid mixture of polyoxymethylene glycol and 0.5% by weight of the superpolyamide terpolymer. The resultant composition was tested for thermal stability as determined by its reaction rate constant for thermal degradation at 222° C. ($k_{222}$). The ratio of the $k_{222}$ for this composition to the $k_{222}$ for the same polyoxymethylene glycol, not treated with a polyamide, was 1.76.

The foregoing examples illustrate certain features of the present invention, but it is to be understood that these examples are not intended to limit this invention.

A preferred composition is a polyoxymethylene diacetate, having a number average molecular weight of at least 15,000, stabilized with 1% of a superpolyamide, having a degree of polymerization of 100–200 and a melting point of less than 220° C. (such as the terpolymer of polycaprolactam, polyhexamethylene adipamide, and polyhexamethylene sebacamide employed in the above examples), and containing approximately 0.2% of 4,4-butylidene bis(6-tertiary-butyl-3-methylphenol).

It has been found that the composition of this invention is particularly useful for the manufacture of pressure containers such as surge tanks on pumping systems or bottles for spraying liquids with a gaseous propellant under pressure. These polyoxymethylene compositions are remarkably impermeable to water, alcohol, many other organic compounds, and inert gases. Because of the tensile strength, toughness, and the retention of strength properties at elevated temperatures, polyoxymethylene is more desirable for this purpose than any other plastic material known. Other equally good uses for the composition of this invention include the fabrication of shaped articles by methods of extrusion, injection-molding, or blow-molding. Thus, the composition of this invention is highly desirable for the manufacture of shaped articles such as films, fibers, filaments, sheets, rods, tubes, tapes, and irregularly shaped objects such as bottles, toys, gears, and dishes. The polyoxymethylene composition may be modified by the incorporation of pigments, fillers, printing, or decorative matter.

We claim:
1. A normally solid composition of matter comprising a mixture of polyoxymethylene and 0.001% to 50% by weight of a superpolyamide uniformly distributed throughout said polyoxymethylene; the said polyoxymethylene being an addition polymer of formaldehyde in which the polymer chain, exclusive of the terminal portions of the chain, is a series of methylene-to-oxygen linkages of the general formula:

$$-(CH_2-O-)_n-$$

where $n$ is an integer of at least 500; the said superpolyamide being a macromolecular condensation polymer which has recurring carboxamide linkages as integral portions of the polymer chain of said superpolyamide and which, upon hydrolysis, yields monomeric compounds selected from the group consisting of (1) mixtures of dicarboxylic acids and diamines, and (2) omega-aminomonocarboxylic acids.

2. The composition of claim 1 in which said superpolyamide has a melting point of less than 220° C. and is present in said composition in the amount of 0.1% to 10% by weight of said composition.

3. The composition of claim 1 in which said polyoxymethylene is a polyoxymethylene dicarboxylate.

4. The composition of claim 1 in which said polyoxymethylene is a polyoxymethylene diether.

5. A shaped article comprising the composition of claim 1.

6. A film comprising the composition of claim 1.

7. A fiber comprising the composition of claim 1.

8. A filament comprising the composition of claim 1.

9. A normally solid composition of matter comprising a mixture of at least 90% by weight of a polyoxymethylene diacetate having a number average molecular weight of at least 15,000, 0.1%–10% by weight of a terpolymer having the approximate composition of 38% by weight of polycaprolactam/35% polyhexamethylene adipamide/27% polyhexamethylene sebacamide, and about 0.2% by weight of 4,4'-butylidene bis(6-tertiary-butyl-3-methylphenol).

References Cited in the file of this patent

UNITED STATES PATENTS

| 2,296,249 | Austin et al. | Sept. 22, 1942 |
| 2,844,561 | Bechtold et al. | July 22, 1958 |

FOREIGN PATENTS

| 748,856 | Great Britain | May 9, 1956 |

UNITED STATES PATENT OFFICE
CERTIFICATE OF CORRECTION

Patent No. 2,993,025                      July 18, 1961

Richard Glenn Alsup et al.

It is hereby certified that error appears in the above numbered patent requiring correction and that the said Letters Patent should read as corrected below.

Column 2, lines 28 and 29, after "linkages" strike out the period; line 33, for "for" read -- form --; column 7, line 33, for "$S_{222}$" read -- $SS_{222}$ --.

Signed and sealed this 28th day of November 1961.

(SEAL)
Attest:

ERNEST W. SWIDER
Attesting Officer

DAVID L. LADD
Commissioner of Patents

USCOMM-DC